United States Patent Office 3,157,659
Patented Nov. 17, 1964

3,157,659
PROCESS FOR PREPARING 2,9-DICHLORO-
QUINACRIDONE
Werner Deuschel, Fribourg, Switzerland, and Berthold
Honigmann, Ludwigshafen (Rhine), Werner Jettmar,
Mannheim-Feudenheim, and Hans Schroeder, Ludwigshafen (Rhine), Germany, assignors to Badische Anilin-
& Soda-Fabrik Aktiengesellschaft, Ludwigshafen
(Rhine), Rhineland, Pfalz, Germany
No Drawing. Filed Apr. 9, 1962, Ser. No. 185,817
Claims priority, application Germany Oct. 10, 1959
3 Claims. (Cl. 260—279)

Of the 7,14 - dioxo - 5,7,12,14 - tetrahydroquinolino-
[2,3-b]-acridine (linear-trans-quinacridone R=H)

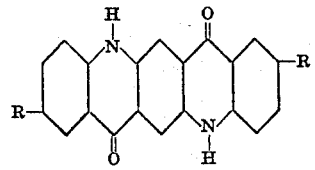

forms referred to as α- and γ-modifications are known which are suitable for the production of bluish-red pigment dyes, but these shades, as compared with the standard red preferred for printing purposes, are either too yellowish or too dull. Moreover, pigment dyes which belong to the above-mentioned α-modification do not have the necessary stability to all organic solvents, as for example xylene, dimethylformamide or N-methylpyrrolidone.

Of 2,9-dichloro-7,14-dioxo - 5,7,12,14-tetrahydroquinolino-[2,3-b]-acridine (linear - trans - 2,9-dichloroquinacridone R=Cl), a red-violet form has been described which is reported to be suitable for the production of pigments. This known 2,9-dichloroquinacridone, which occurs in the oxidation of 2,9-chloro-6,13-dihydroquinacridone in the form of acicular shapes of about 0.5 to about 5 microns length, gives in fine division in a pigment binding agent ruby-red and dull coatings. This form is moreover insufficiently resistant to the processing methods usual in the production of pigments, such as for example grinding and kneading processes and prolonged contact with solvents. This modification must be designated as a β-modification as has been established in the development of the invention described below. The β-modification shows in the X-ray diffraction pattern at a goniometer angle (double glancing angle 2θ) of 5.7°, 13.4°, 14.8°, 26.2° and 27.2° five lines of great intensity, at 18.2° and 22.6° two lines of medium intensity, at 29.8° one line of low intensity and at 24.4° and 25.3° two inflections which depending on the degree of crystallization of the product either almost completely merge into the ascending edge of the powerful line at 26.2° or are situated as small peaks on this edge. This and the other X-ray diffraction patterns referred to in the present specification are plotted with a "Norelco" wide range goniometer (Geiger-counter X-ray spectrometer): radiation CuKα, 40 kv., 20 ma.; angular aperature ¼°, Geiger tube scanning speed ½° per minute, time constant 8.

It is an object of the present invention to provide a new modification of 2,9-dichloro-7,14-dioxo-5,7,12,14-tetrahydroquinolino-[2,3-b]-acridine (linear - trans - 2,9-dichloroquinacridone R=Cl). A further object of this invention is to provide bluish-red pigments of excellent brilliance. Still another object of this invention is to provide a pigment of high color fastness and good stability to organic solvents. These and further objects are achieved by a 2,9-chloro-7,14-dioxo-5,7,12,14-tetrahydroquinolino-[2,3-b]-acridine (linear - trans - 2,9-dichloroquinacridone R=Cl) which we define as a γ-modification and which is characterized in its X-ray diffraction pattern by a line of great intensity at a goniometer angle of 27.8°, four lines of medium intensity at 5.4°, 15.3°, 23.0° and 23.4° and eight lines of low intensity at 16.6°, 19.3°, 21.3°, 24.5°, 25.3°, 26.7°, 29.0° and 30.7°.

The said 2,9-dichloroquinacridone (2,9-dichloro-7,14-dioxo - 5,7,12,14 -tetrahydroquinolino - [2,3-b]-acridine) may be synthesized from 2,5-bis-para-chloranilino-terephthalic acid by ring closure in about 60 to 75% sulfuric acid at a temperature from 140° to 180° C., and gives a crystal form eminently suitable for pigmented systems and which will be referred to as a γ-modification. It can also be obtained by physical modification conversion of the known β-modification and an α-modification (also new) and a further form (also new) whose modification cannot be clearly identified, the crystallite size being too small.

The γ-modification especially suitable for the new pigmented systems is recognized in its X-ray diffraction pattern by a line of great intensity at a goniometer setting of 27.8°, four lines of medium intensity at 5.4°, 15.3°, 23.0° and 23.4° and eight lines of low intensity at 16.6°, 19.3°, 21.3°, 24.5°, 25.3°, 26.7°, 29.0° and 30.7°. If the mean primary particle size is less than about 0.1 micron, only an inflection can be detected in the ascending edge of the line at 23.4°. This modification is characterized by a bluish-red shade, good general fastness, above all excellent fastness to light and weathering, and resistance to high temperatures. It is insensitive to chemical influences and not attacked by solvents or plasticizers. At a mean primary particle size of less than 0.1 micron, preferably of 0.02 to 0.07 micron, it has the hue of a standard red shade and as a pigment has good tinctorial strength, high brilliance and transparency. If the mean primary particle size is more than 0.1 micron, especially 0.3 to 0.7 micron, a bluish-red pigment results which is marked by good hiding power and purity of shade, the hue being clearly displaced toward yellow as compared with the γ-modification with smaller particle size.

The α-modification, from which the above-defined γ-modification can be obtained by physical conversion, shows in the X-ray diffraction pattern at a goniometer setting of 13.9° and 27.7° two lines of great intensity; at 5.6°, 15.4°, 22.7° and 25.9° four lines of medium intensity and at 18.6°, 24.2° and 24.8° three lines of low intensity. The two weak diffraction lines at 24.2° and 24.8° appear as broad lines when the mean primary particle size lies below about 1 micron. This modification is red-violet.

The unclassified form, from which the γ-modification can be obtained by physical conversion, can only be identified by means of X-ray diffraction analysis by two characteristic lines at a goniometer angle of 5.2° and 27.3° and by two strongly broadened lines at about 14.3 and 21.0°, the crystallite size being too small.

This form with the small crystallite range is a strongly bluish violet product.

The X-ray diffraction pattern of the β-modification and of the hitherto unknown α- and γ-modifications are reproduced in the accompanying drawings.

Pigmented systems which contain the γ-modification of 2,9-dichloroquinacridone as a component of a mixture of substances are characterized by their bluish-red shade of excellent brilliance, high color fastness and high stability to processing. As compared with the known β-modification which is duller in shade and less stable to processing, the γ-modification is distinguished above all by its greater purity of shade and its stability to temperature and solvents.

Pigmented systems which contain the γ-modification, possibly together with other components, as a constituent of mixtures of substances, include: pastes, flush pastes, preparations, printing colors, distempers, binder colors or lacquers or varnishes of all kinds, such as physically and oxidatively drying lacquers and varnishes, acid, amine and peroxide curing varnishes or polyurethane varnishes. The pigments may also be present in synthetic, semi-synthetic or natural macromolecular substances, such as thermoplastic resins, e.g., polyvinyl chloride, polystyrene, polyethylene, polyesters, phenoplasts, aminoplasts and rubber. The pigment may also be present in admixture with natural, regenerated or synthetic fibers, such as glass, silicate, asbestos, woods, cellulose, acetylcellulose, polyacrylonitrile, polyester, polyurethane and polyvinyl chloride fibers or mixtures thereof, and also in powders, for example organic or inorganic pigments, rock flour, cement, plaster of Paris, starches and wood flour. Prints, paint and varnish coatings, coverings, molded articles, such as sheets, threads, plates, blocks, granulates and rods of bluish-red or red color of excellent durability are obtained with the new pigments.

Mixtures of substances which contain the extremely brilliant new pigments as active coloring ingredient may be of solid, elastic, pasty, viscous, mobile or thixotropic consistency. They may be obtained by conventional methods. Aqueous pastes may be obtained for example by stirring the pigments into water, possibly with the addition of a wetting or dispersing agent, or by stirring or kneading the pigments into a dispersing agent in the presence of water and possibly of organic solvents or oils. These pastes may be used for the preparation of flush pastes, printing colors, distempers, plastic dispersions and spinning solutions. The pigments may also be introduced by stirring, rolling, kneading or grinding into water, organic solvents, non-drying oils, drying oils, lacquers, varnishes, plastics or rubber. Finally it is also possible to use the pigments for preparing mixtures of substances by dry mixing with organic or inorganic masses, granulates, fibrous materials, powders and other pigments.

The γ-modification may be obtained by contacting finely particled 2,9-dichloroquinacridone of any modification with 60 to 75% sulfuric acid at 145° to 175° C.

Such initial materials suitable for the conversion process are the α- and β-modification and the unclassified form or mixtures of two or more of them. The β-modification may also be obtained in the form of very fine ruby-red needles directly by oxidation of 2,9-dichloro-6,13-dihydroquinacridone in known manner and also by ring closure of 2,5-bis-para-chlor-anilino-terephthalic acid in polyphosphoric acid.

The 2,9-dichloroquinacridone of the α-modification is obtained by ring closure of 2,5-bis-para-chlor-anilino-terephthalic acid in sulfuric acid in the form of claret flat prismatic crystals.

The unclassified form with very small crystallite size is obtained by precipitation of a 5% solution of dichloroquinacridone in concentrated sulfuric acid by means of ice-water.

It is advantageous to use the initial materials in finely divided form, say in a size of about 1μ or less. The initial materials may be reduced to finely divided form, for example by the application of grinding and shearing forces, in known manner, if desired in the presence of water-soluble inorganic salts or by the precipitation of solutions of salts of 2,9-dichloroquinacridone with acids or alkali.

The amount of sulfuric acid used with reference to the initial material to be converted, may be varied within wide limits. If conversion is to be effected by allowing the initial material to stand in contact with sulfuric acid, it is sufficient if the 2,9-dichloroquinacridone is thoroughly moistened with sulfuric acid. The mixture of 2,9-dichloroquinacridone and sulfuric acid may also be in the form of a paste or a thinly liquid suspension. Pasty mixtures are preferred when the conversion process is to be accelerated by grinding or kneading. A thinly liquid suspension is easy to stir. Sodium sulfate may be coemployed as a grinding auxiliary. The duration of the conversion process depends on various factors. The concentration, the amount and the temperature of the sulfuric acid used as well as the mechanical operations determine the time required for conversion. For example, when the conversion is carried out in 65% sulfuric acid while stirring, about 30 minutes is required when working at 165° C., while about two and half hours is required at a temperature of 145° C. These temperatures need not, however, be employed if grinding or kneading is applied. In this case conversion may be achieved even at a temperature of between 20° and 100° C., but there is the disadvantage that the mixture usually heats up under the influence of friction. Being aware of the X-ray diffraction pattern of the new pigment modification, a skilled worker will have no difficulty in following the course of the conversion process and he can discontinue the reaction as soon as the desired new pigment modification has formed. The time required may be ascertained by a preliminary test carried out under the desired conditions. It is of no consequence, if the time necessary for conversion is exceeded.

Conversion of any modification or mixtures thereof into the pure γ-modification is carried out by contacting them with 60% to 75%, preferably 65% to 70%, sulfuric acid in the temperature range of 145° to 175° C., advantageously at about 160° C.

The following examples will further illustrate this invention but the invention is not restricted to these examples. The parts and percentages specified in the examples are by weight. The temperatures are given in degrees centigrade.

Example 1

20 parts of the bluish-red pigment prepared according to the following paragraph (c) are triturated with 60 parts of linseed oil varnish in the usual way on a three-roller apparatus. The printing color prepared in this way, which is especially suitable for multicolor printing, gives when used in book or offset printing brilliant bluish-red prints with excellent fastness properties, especially good light fastness, and excellent transparency.

(a) 100 parts of 2,9-dichloroquinacridone, for example the γ-modification which has been obtained by ring closure from 2,5-bis-para-chloranilino-terephthalic acid in 10 times the amount of 85% sulfuric acid at 150° C. or the β-modification obtained in the same way in polyphosphoric acid with a phosphorus pentoxide content of 80.7% are dissolved in 2000 parts of concentrated sulfuric acid at 25° C., and precipitated by pouring into 1600 parts of ice-water. After filtration by suction, washing and drying, the product is a violet powder which gives violet pigment dyeings. Its X-ray diffraction pattern shows two lines at a goniometer angle of 5.2° and 27.3° and two strongly broadened bands at about 14.3° and 21.0°. The violet powder is especially well suited for conversion into the γ-modification.

(b) 50 parts of 2,9-dichloroquinacridone is dissolved in 1000 parts of sulfuric acid of 96% concentration and the solution is poured into 10,000 parts of ice-water with intense stirring. The fine violet precipitate is separated from the acid in conventional manner and washed neutral with water.

The filter cake thus obtained is substantially freed of water by repeated suspension in and separation from methanol, and then dried at 60° C.

There is obtained 23.6 parts of dichloroquinacridone in the form of a finely particled powder.

(c) 5 parts of the product obtained in the manner described in Example 1(b) is heated to 145° C. for two and a half hours in 250 parts of sulfuric acid of 60% concentration. After cooling, the red-violet dispersion is filtered off by suction at reduced pressure and the residue is washed with 100 parts of 60% sulfuric acid. Any acid which still adheres to the product is removed therefrom by intense washing with water and the filter cake is dried at 60° C. in vacuo. There is obtained a red-violet powder, the particles of which are mainly from 0.05 to 0.1µ in length in the direction of their greatest extension. The X-ray diffraction pattern shows a line of strong intensity at a goniometric angle of 27.8°, three lines of medium intensity at angles of 5.4°, 15.3° and 23.4°, eight lines of poor intensity at angles of 16.6°, 19.3°, 21.3°, 24.5°, 25.3°, 26.7°, 29.0° and 30.7° and an inflection at an angle of 23.0°.

The red-violet powder can be used for preparing bluish red and transparent colorations of all kinds.

(d) When using sulfuric acid of 67.5% concentration, instead of 60% concentration as in Example 1(c) and carrying out the conversion for half an hour at 165° C. a ruby-red crystal powder of the γ-modification is obtained, the X-ray diffraction pattern of which shows a line of marked intensity at a goniometric angle of 27.8°, four lines of medium intensity at an angle of 5.4°, 15.3°, 23.0° and 23.4° and eight lines of poor intensity at an angle of 16.6°, 19.3°, 21.3°, 24.5°, 25.3°, 26.7°, 29.0° and 30.7°. It can be immediately used as a bluish red pigment of good hiding power.

If sulfuric acid with more than 75% concentration is used a coarsely crystalline form of the α-modification of 2,9-dichloroquinacridone will be obtained from 145° C. and upwards.

(e) 5 parts of 2,9-dichloroquinacridone is dissolved in 70 parts of 96% sulfuric acid and to this solution 30 parts of water is added rapidly while cooling well and stirring. The dispersion is heated to 160° C. for 30 minutes and then further processed as in Example 1(c). The brilliant red powder obtained has the same properties as the one obtained according to Example 1(d).

(f) Such an amount of the aqueous paste obtained as a filter cake in Example 1(b) as to contain 5 parts of 2,9-dichloroquinacridone has added to it so much water and sulfuric acid of 96% concentration that 250 parts of 67.5% sulfuric acid is obtained.

The suspension is further processed as in Example 1(d). The red-violet powder obtained can be directly used for the preparation of bluish red pigment dyeings of great color strength. The X-ray diffraction pattern shows that this powder is identical with the γ-modification according to Example 1(d). The size of the particles varies between 0.2 and 0.4µ in the direction of their greatest extension.

*Example 2*

5 parts of the bluish-red pigment, obtained for example according to Example 1(c), are triturated in a ball mill with a nitrocellulose solution which contains 10 parts of nitrocellulose (alcohol-soluble, low viscosity), 5 parts of dibutyl phthalate, and 80 parts of a 9:1 ethyl alcohol/ethyl glycol mixture. A red intaglio printing color is obtained which is suitable for the production of prints eminently stable to light and solvents and which do not bleed.

Printing pastes for other purposes, for example for textile printing and screen printing, may be obtained analogously by appropriate modification.

*Example 3*

2 parts of the finely particled pigment obtained for example according to Example 1(c) are mixed in a ball mill in the usual way with a lacquer consisting of 9.5 parts of an ester-soluble nitrocellulose (moist with alcohol), 2.5 parts of dibutyl phthalate, 1.5 parts of benzyl butyl phthalate, 2 parts of a synthetic resin, as for example the product obtained from cyclohexanone by treatment with sodium hydroxide, 16 parts of butyl acetate, 5.5 parts of methyl acetate and 13 parts of pure toluene. Coatings prepared with this lacquer are distinguished by their bluish-red shade and also by good transparency, outstanding fastness to light and overspraying. If the pigment obtained according to Example 1(d) is used, a bluish red coating with hiding properties is obtained.

*Example 4*

8 parts of the pigment obtained for example according to Example 1(f) are triturated in a cone mill or ball mill in a baking lacquer of 40 parts of coconut oil alkyd resin (40% coconut oil), 12 parts of urea-formaldehyde resin, 40 parts of xylene and 8 parts of normal butanol. With this preparation, coatings may be prepared which, after curing by baking, are highly glossy and have excellent fastness to weathering and overspraying.

*Example 5*

A mixture of 70 parts of polyvinyl chloride, 30 parts of di-iso-octyl phthalate and 1 parts of titanium dioxide (rutile type) is colored in the usual way with 0.5 part of the pigment obtained for example according to Example 1(c) on a mixing roller apparatus which has been heated to 160° C. A bluish-red plastic composition is obtained from which, for example, sheets or sections may be prepared. The dyeing is distinguished by special fastness to light and plasticizers. A rubber mixture may be colored an intense bluish-red in an analogous way.

*Example 6*

1 part of polystyrene granulate is mixed dry with 1 part of pigment (for example from Example 1(d)) in a mixing drum by powerful shaking. The mixture is then homogenized by means of a color extruder heated to 180° C. The string leaving through the die of the extruder is comminuted in a cutting machine and the dyed granulate thus obtained worked up by injection molding. Brilliant red moldings are obtained which exhibit good fastness to light. Polyethylene and polycaprolactam may be colored red in the same way.

*Example 7*

10 parts of the pigment prepared for example according to Example 1(e), 60 parts of titanium dioxide (rutile type), 25 parts of lithopone, and 15 parts of talc are made into a paste with 30 parts of a wetting liquid (solution of 1% of sodium hexametaphosphate and 3% of a condensation product from sodium 2-naphthalene sulfonate and formaldehyde in water) and triturated in a ball mill. The paste obtained, possibly with the addition of further water, is stirred into 100 parts of a commercial polyvinyl acetate dispersion (about 55% solids content). Coatings which are eminently fast to light and wet wiping can be prepared with the resultant binder color.

A commercial self-vulcanizing rubber latex may be used instead of the polyvinyl acetate dispersion, and thin-walled rubber articles of powerful color may be obtained by dipping suitable molds.

*Example 8*

30 parts of the finely particled pigment obtained according to Example 1(c) in the form of an aqueous paste has added to it 70 parts of a condensation product from sodium 2-naphthalene sulfonate and formaldehyde and such an amount of water that the total mixture amounts to 200 parts. This mixture is ground in a ball mill until the pigment shows the desired degree of fineness. The pigment paste thus obtained disperses immediately in water like ink. It is preferably used for pigmenting aqueous media, for example plastic dispersions, latex, binder colors, distempers, paper in pulp or spinnable alkali cellulose xanthate.

This pigment paste may also be completely dried by spray drying or another mild drying process. The pigment preparation thus obtained behaves in aqueous media like the paste.

*Example 9*

20 parts of heavy spar are suspended with 10 parts of aluminum sulfate in 100 parts of water. Then there are stirred in 5 parts of water-containing sodium carbonate, dissolved in 50 parts of water, and 10 parts of the aqueous dye paste from Example 1(f) which contains 15% of pigment. Finally a solution of 12 parts of barium chloride in 120 parts of water is added, the precipitate deposited is filtered off by suction and the residue washed with water. 20 parts of the resultant paste are mixed with 4 parts of a 20% glue solution. A wallpaper color is obtained in this way which gives red wallpaper of very good fastness to light.

*Example 10*

A suspension of 33 parts of the pigment paste from Example 1(e) in 40 parts of water is mixed in the usual way with a cement mixture of 100 parts of cement and 400 parts of sand. Red cement plates of outstanding durability of color can be cast with this mixture.

Plaster of Paris may be colored red in a similar way.

*Example 11*

6 parts of the paste obtained according to Example 1(c) are homogeneously dispersed in 1250 parts of dissolved cellulose xanthate with a content of 8% of α-cellulose. The spinning solution thus dyed is spun in the usual way into a sulfuric acid-zinc sulfate precipitating bath. Bluish-red threads of excellent uniformity of shade are obtained.

*Example 12*

9 parts of a finely particled pigment from Example 1(c), 1 part of a commercial copper phthalocyanine dye and 20 parts of aluminum hydroxide are triturated on a three-roller machine in the usual way with 60 parts of linseed oil varnish. The printing color prepared in this way, when used for book or offset printing, gives violet prints with very good light fastness and good purity.

This application is a continuation-in-part of our copending application Serial No. 60,841, filed October 6, 1960.

We claim:

1. A process for the production of a pigment dye wherein 2,9-dichloro-7,14-dioxo-5,7,12,14-tetrahydroquinolino-[2,3-b]-acridine in fine particle size is brought into contact with sulfuric acid of the concentration 60% to 75% and at temperatures of 145° C. to 175° C. until an X-ray diffraction pattern shows at a goniometer angle of 27.8° one line of great intensity, at 5.4°, 15.3°, 23.0° and 23.4° four lines of medium intensity and at 16.6°, 19.3°, 21.3°, 24.5°, 25.3°, 26.7°, 29.0° and 30.7° eight lines of low intensity.

2. A process for the production of a pigment dye wherein a 2,9-dichloro-7,14-dioxo-5,7,12,14-tetrahydroquinolino[2,3-b]-acridine is subjected to mechanical forces by grinding and shearing in the presence of sulfuric acid of the concentration 60% to 75% until an X-ray diffraction pattern shows at a goniometer angle of 27.8° one line of great intensity, at 5.4°, 15.3°, 23.0° and 23.4° four lines of medium intensity and at 16.6°, 19.3°, 21.3°, 24.5°, 25.3°, 26.7°, 29.0° and 30.7° eight lines of low intensity.

3. The process as claimed in claim 2, wherein said mechanical forces are allowed to act in the presence of said sulfuric acid and of sodium sulfate.

References Cited in the file of this patent

UNITED STATES PATENTS

| 2,840,568 | Brouillard et al. | June 24, 1958 |
| 2,857,400 | Cooper | Oct. 21, 1958 |
| 3,017,414 | Minnich et al. | Jan. 16, 1962 |

FOREIGN PATENTS

| 828,052 | Great Britain | Feb. 10, 1960 |